United States Patent [19]

Chen

[11] Patent Number: 4,603,844
[45] Date of Patent: Aug. 5, 1986

[54] CUSHION ISOLATOR

[76] Inventor: Thomas Chen, No. 6, Lane 164, Yuan Da Rd., Sec. 1, Yuanlin Chunghwa, Taiwan

[21] Appl. No.: 666,545

[22] Filed: Oct. 30, 1984

[51] Int. Cl.⁴ .............................................. F16F 9/04
[52] U.S. Cl. .................................... 267/118; 248/602; 248/635; 267/64.27; 267/64.28; 267/152
[58] Field of Search ................. 267/35, 64.11, 64.16, 267/64.27, 64.28, 113, 118, 122, 123, 140.1, 152; 74/18.2; 92/44, 98 D, 85 R, 107, 168 B; 188/1.11; 248/559, 562, 602, 631, 635, 636; 403/50, 51

[56] References Cited

U.S. PATENT DOCUMENTS

| Re. 20,887 | 10/1938 | Mercier | 267/64.27 X |
|---|---|---|---|
| 2,115,072 | 4/1938 | Hunt et al. | 267/64.16 X |
| 2,125,129 | 7/1938 | Sauzedde | 74/18.2 X |
| 2,773,686 | 12/1956 | Nash | 267/64.27 X |
| 3,235,221 | 2/1966 | Conner | 267/64.27 X |
| 4,033,607 | 7/1977 | Cameron | 188/1.11 X |

FOREIGN PATENT DOCUMENTS

| 1952065 | 4/1971 | Fed. Rep. of Germany | 92/44 |
|---|---|---|---|
| 1139533 | 1/1969 | United Kingdom | 248/562 |

Primary Examiner—Bruce H. Stoner, Jr.
Assistant Examiner—Richard R. Diefendorf
Attorney, Agent, or Firm—Bacon & Thomas

[57] ABSTRACT

A cushion isolator comprising a base body, a drum vertically disposed on the base body, a supporting plate disposed on the upper flange of the drum, a valve disposed in the inlet of the passage, a first fixing plate securing the drum on the base body and a second fixing plate securing the drum on the base body, whereby the cushion isolator can absorb the shock of a running machine.

6 Claims, 3 Drawing Figures

CUSHION ISOLATOR

BACKGROUND OF THE INVENTION

The present invention relates to a cushion isolator and in particular to one designed to absorb the shock produced by a machine.

Generally, there are two known methods of absorbing the shock produced by a running machine. The first one utilizes screws to fix the machine on the ground. However, it is difficult to extend the screws into the ground and once fixed it is laborious to change the position of the machine. The other one makes use of rubber pads mounted on the bottom of the machine to absorb the shock produced by a running machine. Nevertheless, it is only suitable for use with small machines.

Therefore, it is an object of the present invention to provide a cushion isolator which can eliminate the above-mentioned drawbacks.

SUMMARY

It is the primary object of the present invention to provide a cushion isolator which can absorb the shock of a running machine.

It is another object of the present invention to provide a cushion isolator which does not need to be rigidly secured on the ground.

It is still another object of the present invention to provide a cushion isolator which is simple to install.

It is still another object of the present invention to provide a cushion isolator which is easy to adjust.

It is still another object of the present invention to provide a cushion isolator which is durable.

It is a further object of the present invention to provide a cushion isolator which is simple in construction.

Other objects and merits and a fuller understanding of the present invention will be obtained by those having ordinary skill in the art when the following detailed description of the best mode contemplated for practicing the invention has been read in conjunction with the accompanying drawings wherein like numerals refer to like or similar parts.

DETAILED DESCRIPTION OF THE PREFERRED EMBODIMENT

Before explaining the present invention is detail, it is to be understood that the invention is not limited in its application of the details of construction and arrangement of parts illustrated in the accompanying drawings, since the invention is capable of other embodiments and of being practiced or carried out in various ways. Also it is to be understood that the phraseology or terminoly employed herein is for the purpose of description and not of limitation.

Figure 1:
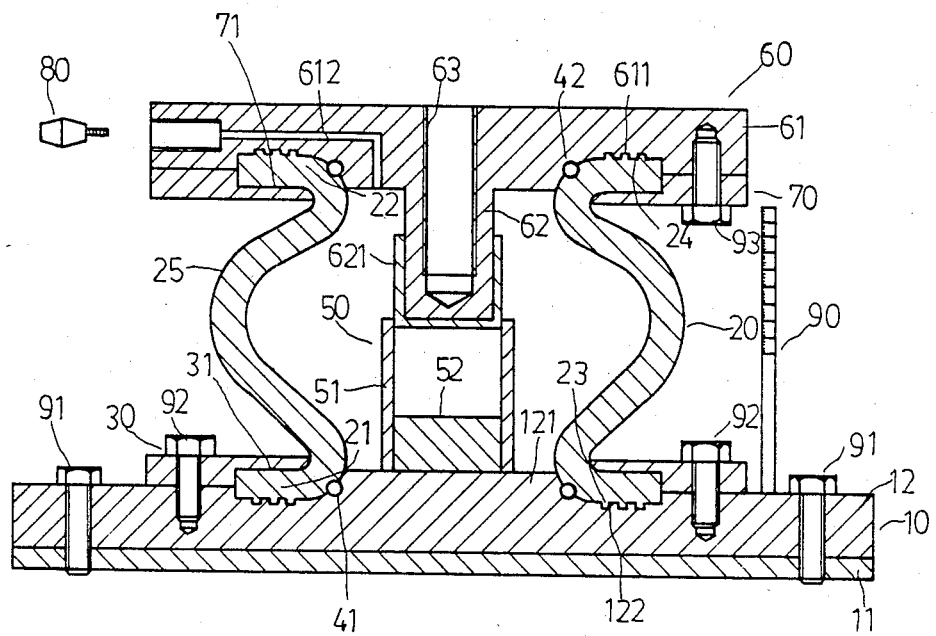
FIG. 1 is a cross-sectional view of a cushion isolator embodying the present invention.

Referring to the drawings and in particular to FIG. 1 thereof, the cushion isolator according to the present invention comprises a base body 10 having a first base 11 made of flexible material and a second base 12 made of metal. The second base 12 is secured on the first base 11 by a predetermined number of screws 91. The second base 12 is formed at the center with a circular platform 121 around which are a plurality of grooves 122.

A drum 20 made of flexible material is mounted on the first base 12. The drum 20 is provided with a lower flange 21 having protuberances 23 adapted to the grooves 122 of the second base 12.

A seal 41 is located between the lower part of the drum 20 and a platform 121 of the second base 12. A first fixing ring 30 is fastened on the second base 12 by screws 92, with its recess 31 pressing the lower flange 21 of the drum 20 on the second base 12, so that the pressurized gas within the drum 20 is prevented from leaking out thereof.

A guiding member 50 is provided on the center of the platform 121 of the second base 12. The guiding member 50 comprises a sleeve 51 secured on the platform 121 and a cushion 52 mounted in the sleeve 51. The cushion 52 is cylindrical in shape and made from flexible material.

A supporting plate 60 is disposed on the upper flange 22 of the drum 20, with its grooves 611 engaged with corresponding protuberances 24 of the upper flange 22. A seal 42 is located between the supporting plate 60 and the upper flange 22. The supporting plate 60 comprises a circular disk 61 having a passage 612 and a cylindrical portion 62 provided on the lower part thereof. The lower end of the cylindrical portion 62 is received in a cap 621 made of flexible material and movable within the sleeve 51. A threaded hole 63 is provided on the center of the circular disk 61.

A second fixing plate 70 is fastened on the bottom of the supporting plate 60 by screws 93 with its recess 71 pressing the upper flange 22 of the drum 20 on the circular disk 61 so that the pressurized gas within the drum 20 is prevented from leaking out thereof.

A valve 80 is mounted in the outlet of the passage 612 so as to allow the gas to enter into the drum 20 only.

A pressure gauge 90 is mounted on the second base 12 so as to show the pressure of the pressurized gas in the drum 20.

Figure 2:
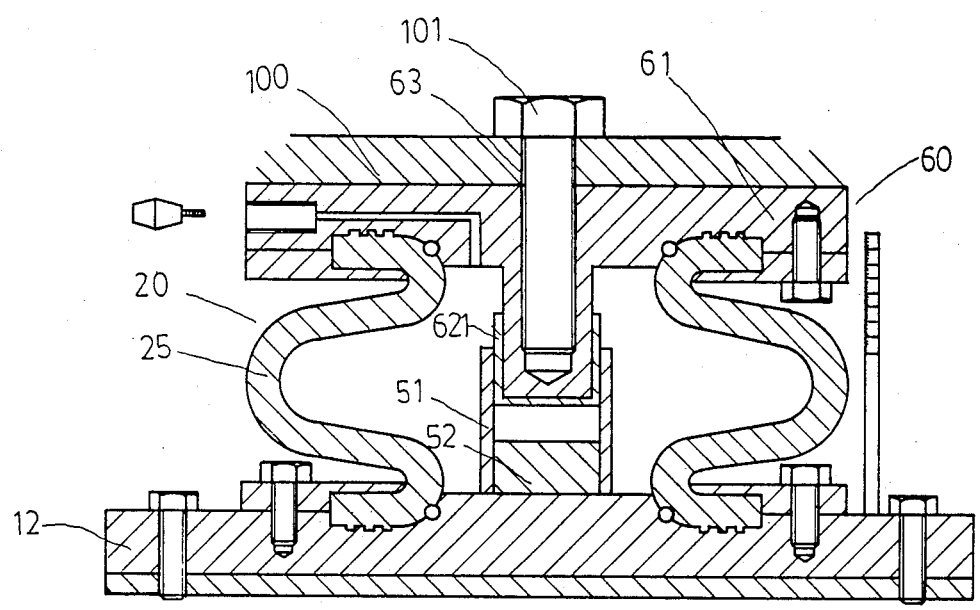
FIG. 2 is a cross-sectional view showing the compressed condition of the cushion isolator.

With reference to FIG. 2, there is shown an application of the present invention. When in use, simply secure firmly a predetermined number of the cushion isolators to the bottom 100 of a machine (not shown) by engaging screws 101 with holes 63 of the supporting plate 61. Consequently, the weight of the machine can be evenly supported by the cushion isolators.

In use, the drum 20 is compressed by the weight of the machine and so the swelling 25 thereof will be expanded. According to PV=NRT (P refers to pressure, V refers to volume, N refers to mole, R refers to gas constant and T refers to absolute temperature), it is understood that the pressure is inversely proportional to the volume. Therefore, as the drum 20 is pressed by the shocking of the machine, the volume thereof is decreased while the pressure is increased to balance the downward force. Meanwhile, the cushion isolator acts as a spring, in which the gas is compressed when there is a force exerting on the cushion isolator and vice versa. Further, since the supporting plate 60 can be moved up and down along a vertical line, the relative positions of the machine will remain unchanged. In other words, it is the same for the machine to fix on the ground.

In case the machine is excessively shocked, the shocking can still be absorbed by the cushion 52 and the cap 621 as well as the cylinder 51 provided on the second base. Further, the first base 11 is closely attached on the ground thereby causing large friction to prevent the movement of the machine.

It should be noted that the load applied on the cushion isolator depends on the material, the thickness, the volume and the pressure of the drum 20. When the pressure of the gas within the drum 20 of a small cushion isolator of the present invention is 0.5–7 kg/cm$^2$, the cushion isolator can receive 25–350 kg. When the pressure of the gas within the drum 20 of a large cushion isolator of the present invention is 5–7 kg/cm$^2$, the cushion isolator can withstand 100–140 kg.

Figure 3:
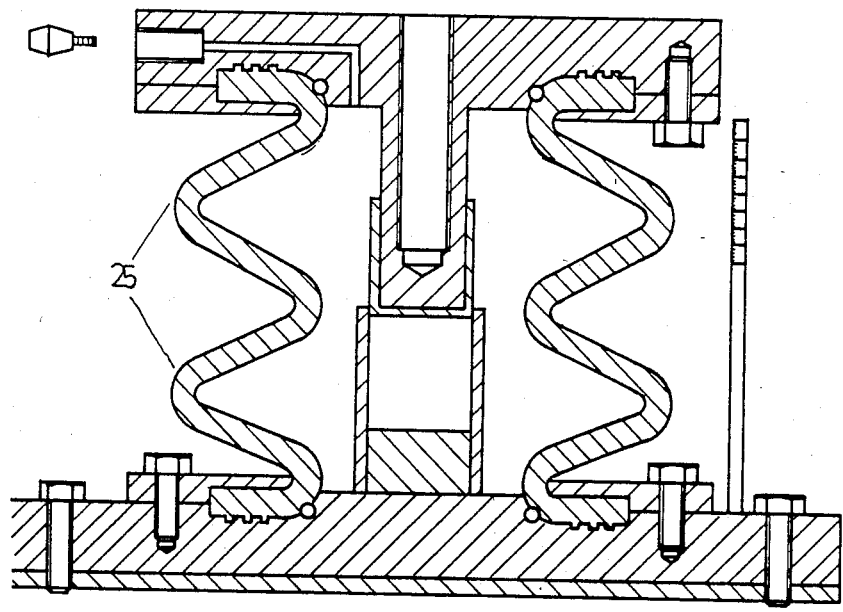
FIG. 3 is a cross-sectional view of a cushion isolator according to another preferred embodiment of the present invention.

Further, the cushion isolator according to the present invention can be modified to one as shown in FIG. 3.

Although this invention has been described with a certain degree of particularity, it is understood that the present disclosure has been made by way of example only and that numerous changes in the detail of construction and the arrangement and combination of parts may be resorted to without departing from the scope of the invention as hereinafter claimed.

I claim:

1. A cushion isolator comprising:
   (a) a base body;
   (b) a supporting plate;
   (c) a hollow, flexible drum having upper and lower flanges disposed between the base body and the supporting plate;
   (d) first means to attach the lower flange to the base body;
   (e) second means to attach the upper flange to the supporting plate;
   (f) a passage defined by the supporting plate and communicating between an exterior surface of the supporting plate and an interior space within the hollow, flexible drum;
   (g) valve means connected to the passage to control the flow of a pressurized gas into the interior of the hollow, flexible drum;
   (h) a hollow guide sleeve attached to the base body and extending into the interior of the hollow, flexible drum;
   (i) a cushion of flexible material disposed on the base body within the hollow guide sleeve;
   (j) a cylindrical member attached to the supporting plate and extending into the interior of the hollow, flexible drum in alignment with the hollow guide sleeve, a distal end of the cylindrical member being slidably received in the hollow guide sleeve such that, during extreme compression of the hollow flexible drum, the distal end of the cylindrical member contacts the cushion of flexible material; and,
   (k) pressure gauge means to indicate the pressure of the gas in the interior of the hollow, flexible drum.

2. A cushion isolator as claimed in claim 1, wherein said base body comprises: a first base of flexible material; and, a second base fastened on said first base.

3. A cushion isolator as claimed in claim 2, wherein said second base and said supporting plate are provided with grooves, and said upper flange and said lower flange of said drum are provided with protuberances adapted to fit in the corresponding grooves of said second base and said supporting plate.

4. A cushion isolator as claimed in claim 3, wherein two seals are provided so that one of said seals is located between said drum and said second base while the other one of said seals is positioned between said drum and said supporting plate.

5. A cushion isolator as claimed in claim 1, wherein said hollow flexible drum has an outwardly convex wall.

6. A cushion isolator as claimed in claim 1, further comprising a cap made of flexible material attached to the distal end of the cylindrical member.

* * * * *